US007908556B2

(12) United States Patent
Shamma et al.

(10) Patent No.: US 7,908,556 B2
(45) Date of Patent: Mar. 15, 2011

(54) METHOD AND SYSTEM FOR MEDIA LANDMARK IDENTIFICATION

(75) Inventors: David A. Shamma, San Francisco, CA (US); Peter Shafton, San Francisco, CA (US)

(73) Assignee: Yahoo! Inc., Sunnvale, CA (US)

(*) Notice: Subject to any disclaimer, the term of this patent is extended or adjusted under 35 U.S.C. 154(b) by 797 days.

(21) Appl. No.: 11/763,391

(22) Filed: Jun. 14, 2007

(65) Prior Publication Data

US 2008/0313570 A1 Dec. 18, 2008

(51) Int. Cl.
*G06F 3/00* (2006.01)
*G06F 3/16* (2006.01)

(52) U.S. Cl. ......... 715/719; 715/720; 715/721; 715/722; 715/726; 715/727; 715/716

(58) Field of Classification Search .................. 715/751, 715/758, 716, 719, 720, 721, 722, 727, 846; 709/223
See application file for complete search history.

(56) References Cited

U.S. PATENT DOCUMENTS

| | | | |
|---|---|---|---|
| 6,910,186 B2 * | 6/2005 | Kim | 715/706 |
| 7,493,559 B1 * | 2/2009 | Wolff et al. | 715/727 |
| 7,685,519 B1 * | 3/2010 | Duncan et al. | 715/711 |
| 2002/0012526 A1 * | 1/2002 | Sai et al. | 386/69 |
| 2002/0091309 A1 * | 7/2002 | Auer | 600/300 |
| 2003/0174160 A1 * | 9/2003 | Deutscher et al. | 345/716 |
| 2003/0231198 A1 * | 12/2003 | Janevski | 345/704 |
| 2004/0123320 A1 * | 6/2004 | Daily et al. | 725/61 |
| 2004/0201633 A1 * | 10/2004 | Barsness et al. | 345/864 |
| 2004/0212636 A1 * | 10/2004 | Stata et al. | 345/703 |
| 2006/0036960 A1 * | 2/2006 | Loui | 715/764 |
| 2006/0282776 A1 * | 12/2006 | Farmer et al. | 715/719 |
| 2008/0039072 A1 * | 2/2008 | Bloebaum | 455/425 |

OTHER PUBLICATIONS

Setlur, Vidya et al., "*Semanticons: Visual Metaphors as File Icons*", Eurographics 2005 / M. Alexa and J. Marks (Guest Editors), vol. 24 (2005), No. 3.

* cited by examiner

*Primary Examiner* — Kieu Vu
*Assistant Examiner* — Haoshian Shih
(74) *Attorney, Agent, or Firm* — James J. DeCarlo; Greenberg Traurig, LLP

(57) ABSTRACT

Methods and systems are described for allowing a user to quickly determine parts of a media item in which the user will be interested. In the methods and systems described, a timeline is provided for the media item and semantic icons are used as media landmarks along the timeline. The semantic icons are related to the content or a description of the content at the location in the media item corresponding to the semantic icon's location on the timeline. The semantic icons, in addition to providing some immediate contextual information at a glance, also allow a user access to annotations of the media item. Semantic icons can represent tags, users who have created or modified annotations for the segment of the media item, or other relevant information. The semantic icons may also be used to determine a relative level of interest in different parts of the media item both with respect to the user and with respect to other users.

17 Claims, 3 Drawing Sheets

METHOD AND SYSTEM FOR MEDIA LANDMARK IDENTIFICATION

BACKGROUND

The Internet is increasingly being used to transmit, store, view and share media files. These media files are sometimes short (e.g., two minutes or less) and sometimes much longer (e.g., several hours). The number of media files available to a user on the Internet is growing at an increasing rate. Therefore, the number of options a user of the Internet has when viewing media files is also growing at this increasing rate. A user may be exposed to more media files than he or she has time to experience and may wish to know in which portions of media files he or she will likely be most interested.

However, with current media players it is difficult and inefficient to find specific portions of media items that a user may be interested in. For example, DVD menus provide a predetermined chapter-type listing of the content of a media item, but if a user does not know in which chapter the desired content appeared, the user must still search through the entire media item. When searching using fast forward commands, the potential remains that the user may not recognize the desired material and skip over it multiple times before finally finding and identifying the desired content.

SUMMARY

Methods and systems are described for allowing a user to quickly determine parts of a media item in which the user will be interested. In the methods and systems described, a timeline is provided for the media item and semantic icons are used as media landmarks along the timeline. The semantic icons are related to the content or a description of the content at the location in the media item corresponding to the semantic icon's location on the timeline. The semantic icons, in addition to providing some immediate contextual information at a glance, also allow a user access to annotations of the media item. Semantic icons can represent tags, users who have created or modified annotations for the segment of the media item, or other relevant information. The semantic icons may also be used to determine a relative level of interest in different parts of the media item both with respect to the user and with respect to other users.

One aspect of the disclosure is a method for generating and displaying semantic icons in a graphical user interface. The method includes receiving a request from a user identifying a renderable media item. The request may be render request or some other request that results in the display of a media graphical user interface to the user. The method identifies any annotations associated with the media item and creates a semantic icon from tags in any annotations found. The graphical user interface is then displayed to the user showing the semantic icon on a timeline as a representation of the annotation.

As part of the method, an image may be selected for use as the icon that represents the tag. The image may be selected to represent the content of the tag and may or may not be related to the media type of the tag. For example, a semantic icon does not need to include an image of a speaker or headphones nor include the text "audio." As described further herein, the selection of a semantic icon may include transforming the tag via a transformation selected from a speech-to-text algorithm, an image recognition algorithm, and an image stylization algorithm and matching the transformed tag to the image.

The method may include receiving a user selection of the semantic icon, such as a mouse-click on the semantic icon, and displaying the tag in response to the user selection. Depending on the type of selection, a different action may be performed. For example, receiving a de-selection of the semantic icon from the user may result in removing the display of the tag from the graphical user interface in response to the de-selection.

The method also includes illustrating the semantic icon with a width corresponding to a size of a segment of the media item defined by the annotation.

Another aspect of the disclosure is a method for changing the semantic icon based on the user providing the annotation or the number of users that have annotated the media item. The method includes receiving a request from a first user to associate an annotation with a media item. Information about the first user is obtained and an icon is created from the information about the first user for use in a graphical user interface. The icon may have been supplied by the user or may identify the first user. The graphical user interface with the icon on a timeline at the appropriate location is then displayed to second users in response to requests for graphical user interfaces for the media item.

The icon may be created or selected based on the identity of the first user. If the first user is a member of a community or group of users, an image may be selected for the icon which represents the community or group. Alternatively, this may only be done if a quorum of users have annotated the same location of a media item.

Another aspect of the disclosure is a graphical user interface presenting information about a media item. The graphical user interface includes a timeline element and a semantic icon disposed along the timeline element depicting an attribute of an annotation to the media item. The graphical user interface also includes a media item presentation window that presents the media item beginning at a time associated with the annotation if the semantic icon is selected by a user via a first type of selection. A callout element may also be displayed that presents a tag associated with the annotation and that is displayed if the semantic icon is selected by the user via a second type of selection.

The attribute depicted by the semantic icon may be the tag associated with the annotation by the contributing user. Alternatively, the attribute depicted by the semantic icon may be the identity of a contributing user who created the annotation. The semantic icon is displayed at a location on the media timeline dictated by the annotation and may have a size that corresponds to a size of a segment defined by the annotation.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

A BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

The following description of various embodiments is merely exemplary in nature and is in no way intended to limit the disclosure. While various embodiments have been described for purposes of this specification, various changes and modifications may be made which will readily suggest themselves to those skilled in the art and which are encompassed in the disclosure.

As described above, the Internet is increasingly being used to transmit, store, view and share media files. Entire online communities are developing which allow uploading, viewing, sharing, rating and linking to media items. These communities may use tags to describe or categorize media items.

The term "media item" as used herein may include any media file, now known or later developed, including video files, games, audio, streaming media, slideshows, moving pictures, animations, or live camera captures. A media item may be presented, displayed, played back, or otherwise rendered for a user to experience the media item.

A user may create an annotation to a media item by associating a tag with a portion of the media item. For example, the user may associate a tag with a particular time in the playback of a media item or with a segment (e.g., a scene) of the playback of the media item and the resulting annotation may include the tag, the media item and the time associated with the tag. Annotations may include a time marker (e.g., data indicating a time in the media item) identifying a point or information identifying a segment within a media item. For example, two time markers may be used to mark a start time and/or an end time for playback of the media item.

As used herein, the term "tag" includes any type of information capable of describing or identifying a media item. Examples of tags include text strings, hyperlinks, images, other media items (e.g., video clips), avatars or other icons, emotion icons ("emoticons"), or other representations or designations.

Media landmarks refers to marks on a timeline which are used to represent annotations associated with a point or segment of the playback of a media item corresponding to the location of the media landmark on the timeline. A media landmark may be used to call attention to a particular time and/or to visually depict relevant points of interest within a media item. The user may use a media landmark as a point from which to request playback of the video file via selection of the media landmark. Alternatively or in addition, a user may access additional information about the annotation (e.g., display more tags or the entire text of an annotation) through the media landmark. As described further below, media landmarks may be shown to a user as semantic icons that visually represent the tags or other information associated with the annotation.

Figure 1:
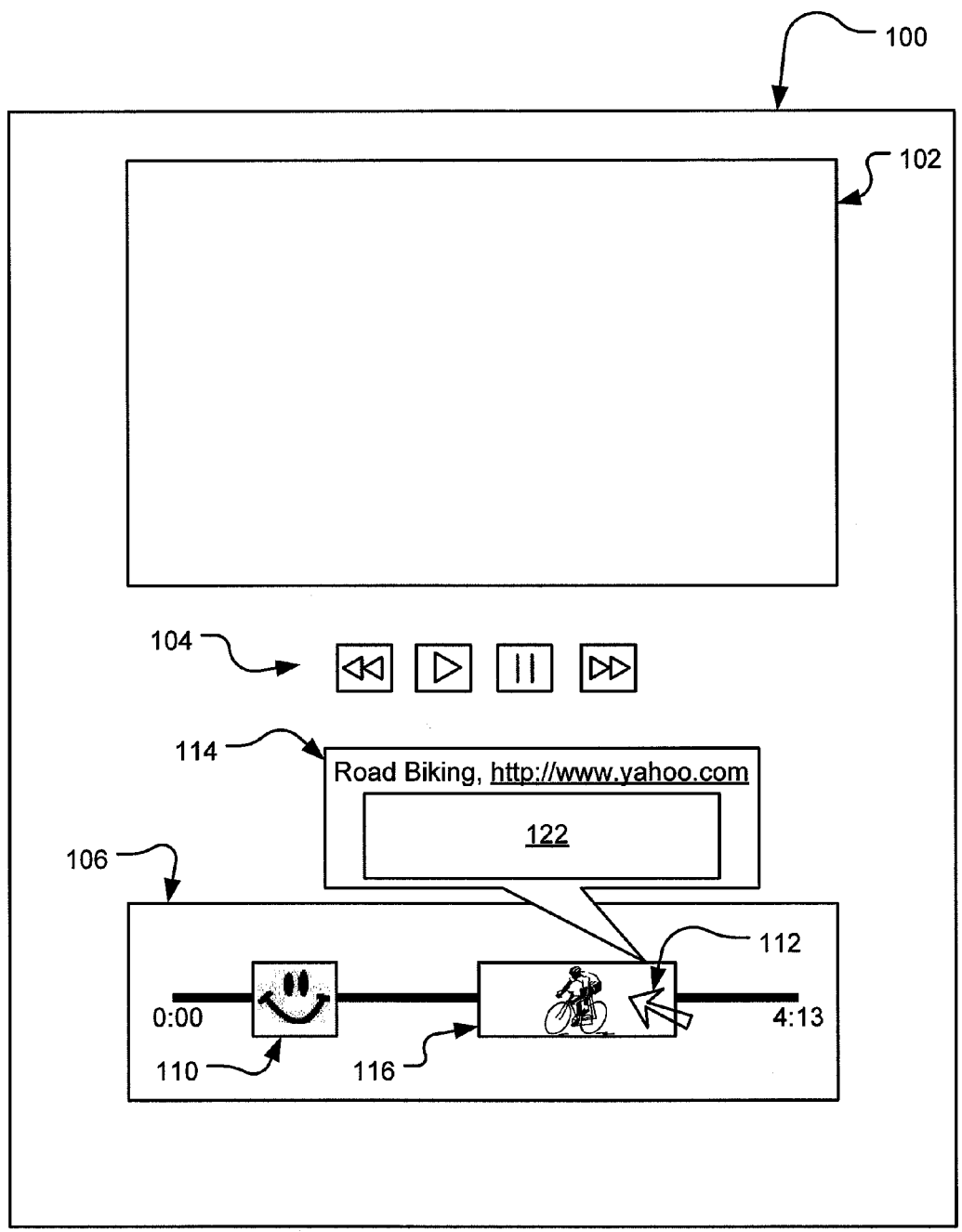
FIG. 1 shows an embodiment of a graphical user interface for presenting a media item with semantic icons.

FIG. 1 shows an embodiment of a media graphical user interface (GUI) 100 for presenting a media item with media landmarks. The GUI 100 is suitable for use with any device adapted to render media items and also retrieve or otherwise access annotations associated with the media items. Thus, the GUI 100 could be used as a GUI for a media player device or a media player application being executed by a computing device. For example, the GUI 100 could be generated and/or displayed by a personal computer (PC), a purpose-built server computer, a web-enabled personal data assistant (PDA), a smart phone, a media player device such as an IPOD, or a smart TV set top box.

The media GUI 100 shown includes a media item presentation window 102 (e.g., a window that displays the visual portion of a video playback), media item playback control elements 104, and media item presentation timeline 106. This basic layout of media item presentation window 102, media item playback control elements 104, and media item presentation timeline 106 is generally known to those with skill in the art, and the particular layout and composition of these elements in FIG. 1 is one exemplary embodiment.

Semantic icon 116 is a media landmark that visually depicts the content of a tag contained in an annotation associated with the segment of the media item corresponding to the location on the timeline 106 at which the semantic icon 116 is located. To create a semantic icon, the content of a tag is extracted and an image is selected to represent the extracted content. For example, the semantic icon 116 which includes an image of a cyclist riding a road bicycle may be created from a text tag such as "road biking" or "cycling" through a matching algorithm or list that matches the text tag to the image. The content of media tags may be extracted through parsing of the media tag using an algorithm such as a speech-to-text conversion algorithm, an image recognition algorithm (e.g., facial recognition), and/or an image stylization/abstraction algorithm. Such algorithms are known to those with skill in the art and any suitable method of matching annotations to images may be adapted for use in creating semantic icons.

Semantic icons can also depict the content of other types of tags, such as media tags, by illustrating the media type (e.g., a speaker for a tag in the form of an audio file or a frame of video for a video file commenting on the segment/location in the media item).

As shown by semantic icon 110, a semantic icon may also be used to visually depict the existence of annotations from a user or a group of users who created and/or contributed to the annotation or tags in the annotation. Semantic icon 110 is generically shown as a simple "smiley face" and is an example of an avatar used by a user as an online representation. Avatars may be personalized by a user and may actually or metaphorically represent the user to others online.

Semantic icons may represent groups of users through any of several means. A group of users may choose representations, such as a group photo, a name of the group, logo or a favorite image of the group. The methods and processes of selecting the semantic icon to represent a media landmark based on the user or users who have contributed to an annotation are described further below.

In the embodiment shown, semantic icons 110, 116 are being used as media landmarks located on the timeline 106, indicating a relevant position or positions of the content of the media item accessed through each semantic icon. In the embodiment shown, semantic icon 116 represents a segment of a media item corresponding to the content between two time markers, a starting time marker and an ending time marker. The semantic icon 116 represents these two time markers by showing an elongated rectangle covering the corresponding segment of the timeline element 106. Semantic icon 110 may represent an annotation with a single time marker, however, in the embodiment shown, it is depicted on the timeline with a wider width than a single line to allow for easy selection of the media landmark by a mouse.

In an embodiment, all time markers 110, 116 may be initially displayed as the same size, regardless of whether they are associated with a point in the media item, a small segment of the media item or a large segment of the media item. A user action, such as selecting the semantic icon 110, 116 may cause the icon to change shape in order to provide additional information about the point or segment to the user, including expanding or contracting to illustrate the size of an underlying segment.

In the embodiment illustrated, the semantic icon 116 is being selected by a mouse pointer 112. There may be several types of selections by the user of a semantic icon. For example, selections may be mouse-related (e.g., using a mouse pointer 112), keyboard-related, or may use some other form of user input. Mouse-related selections by a user may include mouse clicks on a semantic icon or may be a mouse-over of the semantic icon as known by those with skill in the art. In addition, a mouse-related selection may be a combination of clicks or a combination of clicks and mouse-over selections.

Changes in the GUI in response to a selection of a semantic icon by a user may revert or otherwise be undone based on a de-selection. De-selection by a user may include an additional selection by the user, such as an additional mouse click or combination of clicks. De-selection may include removal of a selection by the user through, for example, a user moving a mouse pointer 112 off of the semantic icon. De-selection by a user may occur after a period of time with no further selection by a user, for example, after a mouse-over by a user, a period of time passing without a mouse-related selection by the user.

In addition, certain selections of a semantic icon 110, 116 may initiate playback of a media item. For example, a double mouse-click of a semantic icon may initiate playback at a time marker contained in the annotation represented by the semantic icon. In another example, the passing of some predetermined amount of time after a mouse-over of a semantic icon 116, without the subsequent removal of the mouse pointer 112 from the semantic icon 116, may start the playback of the media item.

In one embodiment, playback is initiated through one type of selection may be playback in the form of a preview and may only last as long as the selection (e.g., mouse-over) continues. Playback may also open a separate window and may be initiated by a different selection by the user of a semantic icon.

In the embodiment shown, a callout 114, sometimes also referred to as a balloon, containing tags is being displayed in response to a selection of the semantic icon 116 by the mouse pointer 112. A selection that opens a callout 114 may be distinct from a selection that starts playback or preview of the media item, as described further above. The tags displayed are the tags of the annotation represented by the semantic icon 116.

The callout 114 shows several types of tags that may be used in an annotation. For example, in addition to the text tag (shown as "Road Biking"), there is a hyperlink, and a second media window 122 for displaying media tags (e.g., video clips, image captures, other images, avatars, and/or emoticons). In various embodiments, the media window 122 may have separate controls and/or may automatically initiate playback of the media tag. Media tags may also be audio tags, such as commentaries or audio clips related to the media item. Similar to the display of media tags in the media window 122, audio tags may be played back upon selection of the semantic icon 116.

Different types of tags along with the easy access provided to them by the GUI 100 allow users added flexibility in expressing relevant descriptions of a media item. As media items become more complex, more personalized, and more commonly used as means of personal expression and communication, the flexibility of annotation to the media items becomes more useful to a user who wishes to annotate a media item. By using other media as annotations, media items may be compared to other media, personal experiences may be shared, and feelings or experiences which users have trouble putting into words may be used to depict or reference a part of the media item being annotated.

Figure 2:
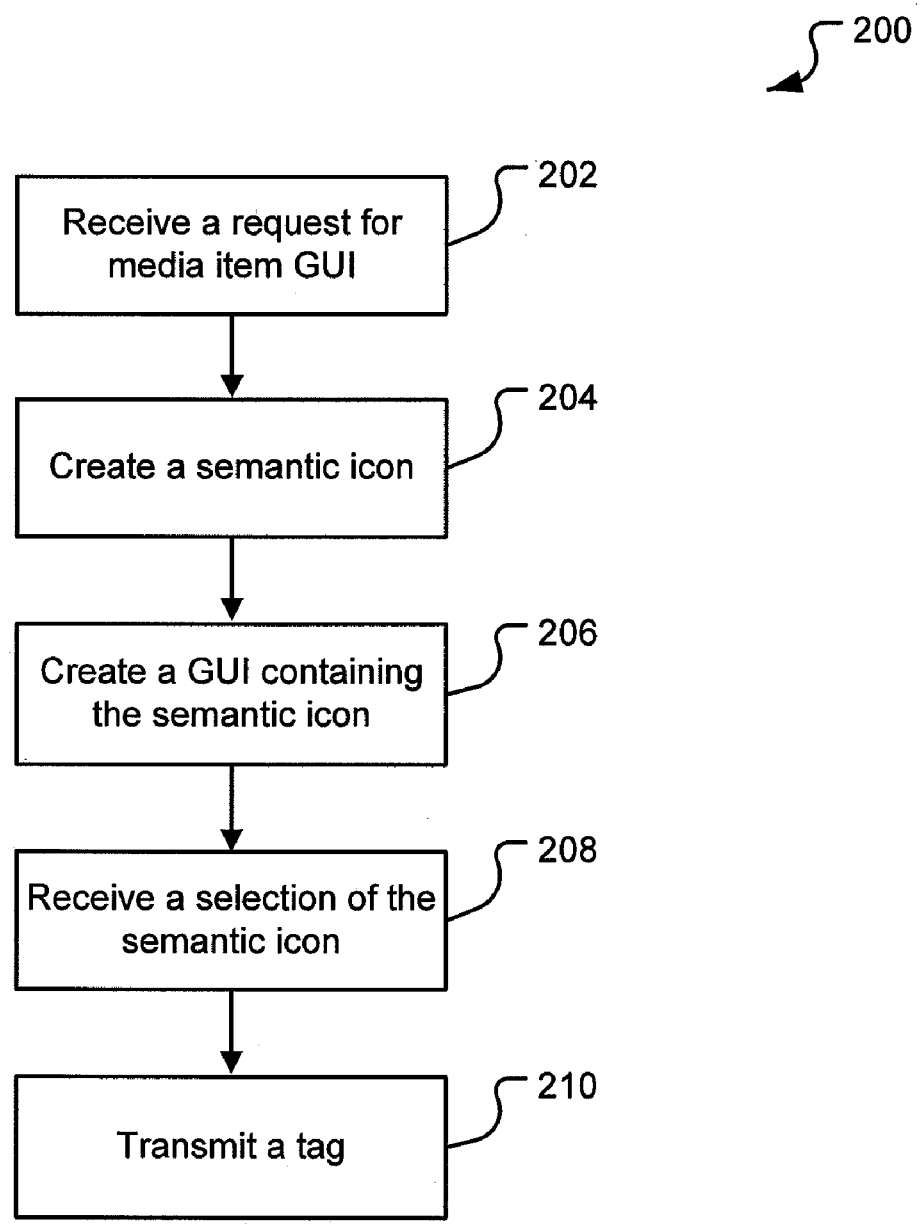
FIG. 2 shows a flow chart of an embodiment of a method for creating and utilizing a semantic icon.

FIG. 2 shows a flow chart of an embodiment of a method 200 for creating a semantic icon. In the embodiment shown, a request is received in operation 202 for a media item or otherwise to access a GUI, such as a web page, for the media item. An example of such request would be the selection of the link associated with a media item that would bring up a media GUI, such as is shown in FIG. 1. The request may, or may not, be a request to render the media item.

In the embodiment shown, based on the request received, a semantic icon is created in a create icon operation 204 from tags contained in the annotation which the semantic icon is representing. The create icon operation 204 may include retrieving one or more pre-selected semantic icons from the media item or from a datastore containing information about or associated with the media item. The operation 204 may also search for and identify any annotations accessible by the system generating the GUI for the media item. For example, in an embodiment, upon receipt of a request to display the GUI, the system may access a meta data database containing annotations and search for annotations or semantic icons in the database associated with the designated media item.

As described further above, algorithms known to those with skill in the art may be used for extracting information from the tags of the annotations. Such algorithms may only be used if there are a multitude of annotations or if the user, previously or with the request, has provided some form of criteria indicating how semantic icons should be selected for display to the user. This information may then be used for creating 204 a semantic icon.

Information used for creating 204 a semantic icon may come from one tag or from more than one tag. For example, a semantic icon depicting a backyard barbeque scene may be created 204 from a text tag "BBQ" that is associated with a point in the media item. A similar semantic icon may be created 204 from an audio tag, based on a speech recognition analysis, that states, "This is why I can't wait for barbeque season." Information extracted from either of these tags may indicate that the user who created the tag was referencing barbequing at the particular time in the media item marked by the annotation.

Information may be taken from two dissimilar tags and used in combination to create a semantic icon. For example, the same text tag "BBQ" and a video tag of people throwing a ball in a park may lead to a semantic icon which combines information extracted from the two tags. Information extracted from the text tag may indicate that the tag was referring to barbequing, summertime, outdoor recreation, Memorial Day, the Fourth of July, and/or social gatherings. Information extracted from the video tag may indicate that the tag was referring to outdoor recreation, summertime, social activities, and/or ball sports (e.g., football, baseball). In combining information from two tags, predictive or interpretive algorithms may be used to determine whether there are attributes between the two tags that would support a homogenous semantic icon. In the above example, either an image depicting a barbeque scene in a park or an image of people playing catch near a picnic table may be a sufficient combination of the two sets of information from the two tags.

When information is combined from more than one tag, the priority or weight of the information need not be treated equally. The information may be weighted differently based on how exactly the information was extracted from the tag. For example, an image recognition result may be weighted less heavily, due to a low degree of confidence, depending on the algorithm used, than a text tag because the text tag likely does not need to be interpreted via an algorithm. As another example, information from tags which are repeatedly or commonly created for an annotation may be weighted more heavily than information from rarely used or less popular tags.

Tags may be in many formats (e.g., video, audio, text) and different extraction methods and algorithms may be used to extract information from the tags. For example, the information extracted may be extracted to any useable format for selecting an image for creation into a semantic icon. The image may be formatted, resized, down-sampled to create the semantic icon.

The image may also be combined with other images selected from information extracted from tags. For example, using the tags discussed above which indicated ball sports and barbeques, two images (e.g., a baseball in a glove and a hotdog in a bun) could be combined into a single semantic icon. The images may be stylized similarly, for example, both reduced to line-drawings of similar sizes and with similar shading colors.

After the semantic icon(s) for the media item are created, a GUI that includes the semantic icon(s) on a timeline is created and displayed to the user in a GUI generation operation 206. If the GUI is generated by a remote device, other than that which is to display the GUI to the user, generation operation 206 may include transmitting the GUI to the user's device. For example, if the user is accessing the media item via a media server, the media server may be responsible for generating some or all of the GUI displayed to the user.

In the GUI, a semantic icon for an annotation may be placed along the timeline at any one of the time markers of the annotation (e.g., start time, end time), at a time marker of a particular tag, or in between any two time markers. As discussed above, the width of the semantic icon may be extended to span the extent of an annotated segment from a start time marker to an end time marker. Also, annotations with only one time marker may be represented by semantic icons that have a size designed to allow easy visual recognition and selection by a user.

If transmitted to the user's device, some or all of the GUI may be transmitted directly or indirectly to a user. The amount transmitted need only be that much necessary for the user's device to generate the final GUI. For example, the GUI could be transmitted in the form of a web page to be displayed in its entirety by a browser or, alternatively, the information may be transmitted which is necessary for the user's device to populate a GUI template.

After a GUI is generated and displayed, a user may interact with the GUI by selecting a semantic icon. If the user selects a semantic icon, that selection is detected by the user's device in a receive selection operation 208. In an embodiment, the receive selection operation 208 may include communicating the selection to a remote device that may have generated the GUI originally. The various types of selections and de-selections which may be received from a user have been discussed above.

Based on the selection of the semantic icon, a tag may be transmitted 210 to a user. As described further above, a callout may be presented to a user based on the user's selection of a semantic icon. The callout may present tags associated with the annotation to the user. The callouts and presentation of the tags are discussed further above. The tags transmitted 210 may be of any format (e.g., text, video, audio, image).

Figure 3:
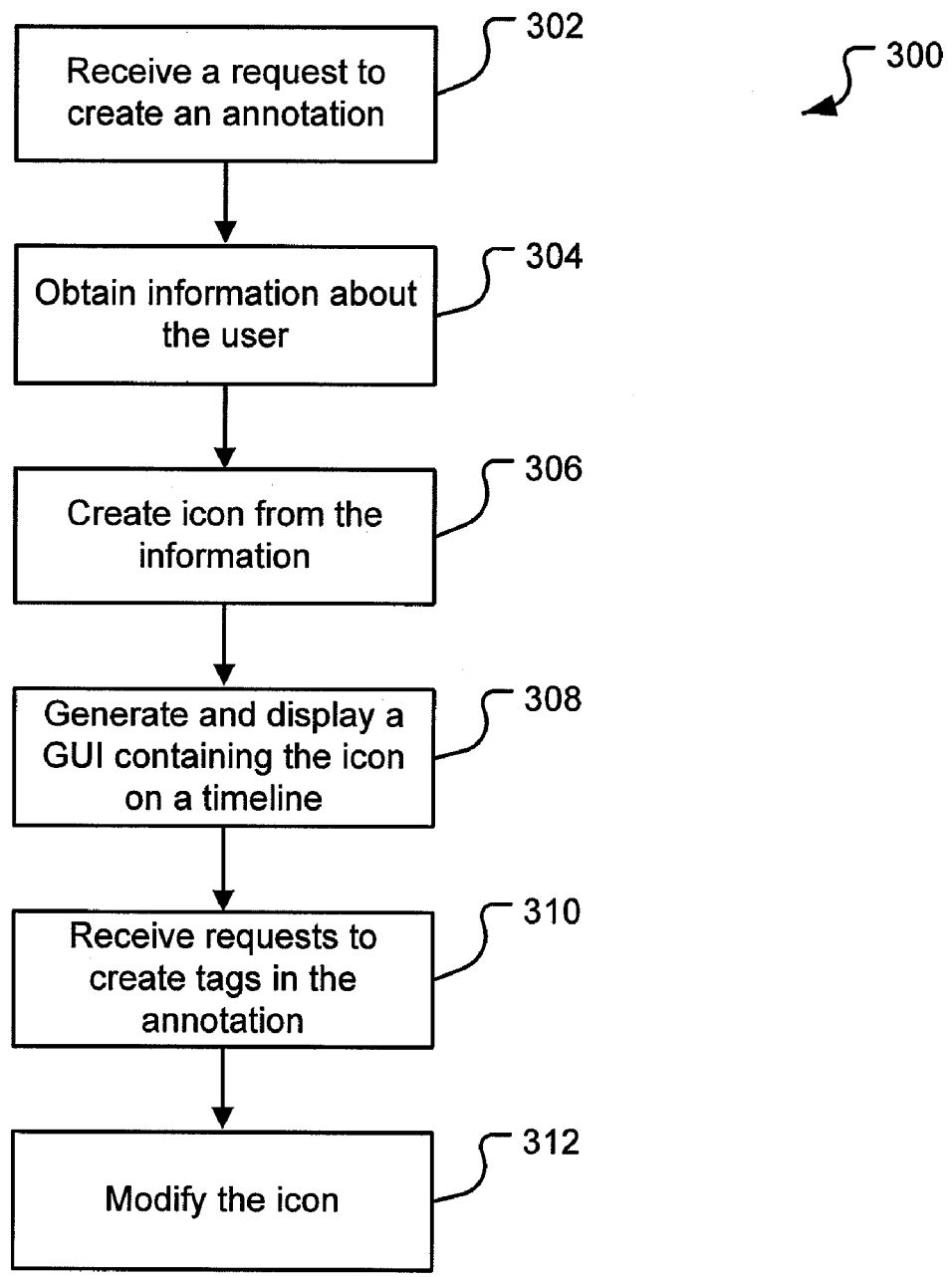
FIG. 3 shows a flow chart of another embodiment of a method for creating and utilizing a semantic icon.

FIG. 3 shows a flow chart of another embodiment of a method 300 for creating a semantic icon. The semantic icons created by method 300 may include information about the user who created the annotation and/or created a tag within the annotation. In the method 300, a request is received to create an annotation to a media item in a receive request operation 302. The request may be received from a user directly or indirectly using any of the methods described above and known in the art. The request received may include one or more annotations for an identified media item including tags or other information such as an identification of the media item, start and end times associated with the annotations if any, and a user identifier. The request could further include the media item itself and may also include an image or other media object specifically provided for use as a semantic icon.

Information is then retrieved about the user who sent the request in an obtain user information operation 304. The information may be retrieved based on a user identification ("user ID" or login name) or other indication of the user provided with the initial request. The information may be a link to or location of further information about the user, such as a link to the user's personal information. The information about the user may be an avatar of the user, a user profile, preferences, blog entries, or other elements of the user's history.

The user information obtained may also be information associated with one or more communities that the user is associated with. For example, if the user is associated with a department (e.g., human resources, facilities engineering, etc.), this may be determined from the user identifier and an image associated with that department may be retrieved for use as a semantic icon in the icon creation operation 306 discussed below.

In addition to information directly associated with the user, the user information obtained may also include information associated with the activity in which the user was involved when the request to create the annotation was received. For example, a user may be a moderator of one forum discussion and may be represented by one avatar in that forum while the user may have another avatar in a different forum where the user is a novice user. This specific information may be used to the exclusion of the other information about the user.

The information about the user is then used to create a semantic icon in an icon creation operation 306. For example, an avatar of the user may be modified by other personal information of the user. In addition, to create the semantic icon, information about the user may be combined with information extracted from the tags created by the user. Any personal information about the user may be used to select an appropriate image for the semantic icon. For example, if a user is a dog enthusiast, a semantic icon representing the user or a group of users may refer to dogs in some way. As another example, a group of users may be referred to by the group's name, an image associated with the group or contact information for the group (e.g., the semantic icon or the tag displayed via a semantic icon may include a link or an email address allowing communication with the group).

After the semantic icon is created, a GUI containing the semantic icon is generated and displayed in a generate GUI operation 308. The generate GUI operation 308 may include any and all of the operations described with respect to the GUI generation operation 206 described with reference to FIG. 2.

In the method 300, the same user or a different user may subsequently wish to associate one or more additional tags with a previously defined segment or point of the media item. This is illustrated in the method 300 shown by a receive subsequent tag request operation 310. In the receive subsequent tag request operation 310, a subsequent request to associate a tag with a previously defined segment or point of the media item is received. The new tag is associated with the segment or point and may be stored in an annotation database for future use, along with the identification of the user making the request.

The receive subsequent tag request operation 310 may be repeated multiple times and tags may continue to be created based on these requests. Eventually a sufficient number of users may create tags for a segment of a media item that the semantic icon selected by the icon creation operation 306 may change as a result.

In the method 300 illustrated, this is illustrated by the modify icon operation 312, which could also be a simple repetition of the icon creation operation 306 after receipt of many different tags over time.

In an alternative embodiment, the modify icon operation 312 may specifically use the number of tags and/or the number of different users who have supplied tags for a segment or point of the media item when selecting a semantic icon. In the embodiment, a threshold number of users, which may be referred to as a quorum of users, is defined and only those segments tagged by at least the quorum of users are displayed on the GUI and/or displayed via a semantic icon. The quorum may be a set number, a number combined with a particular rate (users tagging over a period of time), or a user-defined number set by the user who created the annotation.

In the method 300, semantic icons may be created differently for different users. For example, users in one community may be displayed semantic icons based on annotations provided by other community members. Similarly, depending on whether there is a quorum of community users, semantic icons may or may not be displayed to a user. For example, if the user is a member of a specific drumming community, the user may be able to see semantic icons generated based on annotations provided by a small quorum of other members of the drumming community. However, a user that is not a member of the community may not be provided with the same semantic icons because the quorum of drumming community members is less than a quorum determined for users with only a general interest.

Quorums for community users may be determined by the community administrator. Alternatively, members of a community may be provided with a display community landmarks control element on the GUI that, upon selection, displays some or all of the media landmarks created by members of the user's community. The community may also provide its own images for use as semantic icons. These images may be associated with different predefined tags known and commonly used by the community members.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present disclosure. Alternative embodiments of methods and systems described herein are also possible in which some or all of the operations are performed in a different order or distributed between different devices than those described above. Numerous other changes may be made which will readily suggest themselves to those skilled in the art and which are encompassed in the spirit of the disclosure and as defined in the appended claims.

What is claimed is:

1. A method comprising:
receiving, by a computing device, a request from a user identifying a renderable media item;
creating, by the computing device, a semantic icon from a tag in an annotation associated with a first time in the media item; and
transmitting, by the computing device, a graphical user interface to the user for display, the graphical user interface showing the semantic icon on a timeline as a representation of the annotation, the semantic icon being displayed in a first size and, upon selection by the user, changes to a second size corresponding to a size of a segment of the media item.

2. The method of claim 1, wherein creating the semantic icon further comprises:
selecting an image that represents the tag.

3. The method of claim 2, wherein selecting the image further comprises:
transforming the tag via a transformation selected from a speech-to-text algorithm, an image recognition algorithm, and an image stylization algorithm; and
matching the transformed tag to the image.

4. The method of claim 1, further comprising:
receiving a selection of the semantic icon from the user; and
displaying the tag in response to the selection.

5. The method of claim 4, further comprising:
receiving an indication that the selection of the semantic icon is a mouse-over selection.

6. The method of claim 4, further comprising:
receiving a de-selection of the semantic icon from the user; and
removing the display of the tag from the graphical user interface in response to the de-selection.

7. The method of claim 1, wherein the annotation is further associated with a second time in the media item which is different from the first time in the media item, the method further comprising:
defining a width of the semantic icon based on the difference between the first time and the second time.

8. The method of claim 1, wherein the media item is selected from a video item, a music item, and a slideshow.

9. The method of claim 1, wherein the tag is selected from an image, a video item, and an audio item.

10. A non-transitory computer readable storage medium comprising executable instructions tangibly stored thereon for performing a method, the method comprising the steps of:
  transmitting a graphical user interface to a user for display by a computing device, the graphical user interface displaying:
    a semantic icon disposed along a media timeline element depicting an attribute of an annotation to a media item, the semantic icon being displayed in a first size and, upon selection by the user, changes to a second size corresponding to a size of a segment of the media item, the media item beginning at a time associated with the annotation if the semantic icon is selected by the user via a first type of selection, and
    a tag associated with the annotation that is displayed on the display if the semantic icon is selected by the user via a second type of selection.

11. The non-transitory computer readable storage medium of claim 10, wherein the attribute depicted by the semantic icon is the tag associated with the annotation.

12. The non-transitory computer readable storage medium of claim 10, wherein the attribute depicted by the semantic icon is an identity of a contributing user who created the annotation.

13. The non-transitory computer readable storage medium of claim 10, wherein the first type of selection is different from the second type of selection via the first type of selection having a different duration than the second type of selection.

14. The non-transitory computer readable storage medium of claim 10, wherein the semantic icon is displayed at a location on the media timeline element dictated by the annotation.

15. The non-transitory computer readable storage medium of claim 10, wherein the annotation identifies a segment of the media item and the semantic icon is displayed with a size corresponding to a size of the segment of the media item.

16. The non-transitory computer readable storage medium of claim 15, wherein the second type of selection is a single mouse-click selection.

17. A non-transitory computer readable storage medium comprising executable instructions tangibly stored thereon for performing a method, the method comprising the steps of:
  receiving a request from a user identifying a renderable media item;
  creating a semantic icon from a tag in an annotation associated with a first time in the media item; and
  transmitting a graphical user interface to the user for display, the graphical user interface showing the semantic icon on a timeline as a representation of the annotation, the semantic icon being displayed in a first size and, upon selection by the user, changes to a second size corresponding to a size of a segment of the media item.

* * * * *